United States Patent [19]
Osborn

[11] Patent Number: 5,249,614
[45] Date of Patent: Oct. 5, 1993

[54] LAID FLOORING END JOINTER

[76] Inventor: Michael B. Osborn, 13821 54th Ave. North, Edmonds, Wash. 98026

[21] Appl. No.: 901,352

[22] Filed: Jun. 19, 1992

Related U.S. Application Data

[63] Continuation of Ser. No. 335,668, Mar. 27, 1989, abandoned, filed as PCT/JP88/00683, Jul. 7, 1988.

[51] Int. Cl.$^5$ .................................................. B27C 5/10
[52] U.S. Cl. .............................. 144/371; 144/134 D; 144/136 C; 409/175; 409/178; 409/182
[58] Field of Search ........... 144/134 R, 134 D, 136 C, 144/371; 409/175, 178, 180, 181, 182

[56] References Cited

U.S. PATENT DOCUMENTS

| | | | |
|---|---|---|---|
| 4,273,483 | 6/1981 | Mendicino | 144/136 C |
| 4,281,694 | 8/1981 | Gorman | 144/134 D |
| 4,353,672 | 10/1982 | Smith | 144/134 D |
| 5,040,581 | 8/1991 | Takashima | 144/144.5 GT |
| 5,052,454 | 10/1991 | Meinharst | 144/144.5 GT |
| 5,062,460 | 11/1991 | DeLine | 144/134 D |

*Primary Examiner*—W. Donald Bray
*Attorney, Agent, or Firm*—Robert W. Beach

[57] ABSTRACT

The end of a laid flooring board between adjacent laid flooring boards can be jointed by a jointer including a router mounted on a slide slidable along ways carried by a frame held in position on flooring by pressure on a positioning plate attached to the jointer frame and having a reference line for registration with a flooring joint and an undersurface capable of gripping the flooring to prevent inadvertent shifting of the frame during a jointing operation.

11 Claims, 4 Drawing Sheets

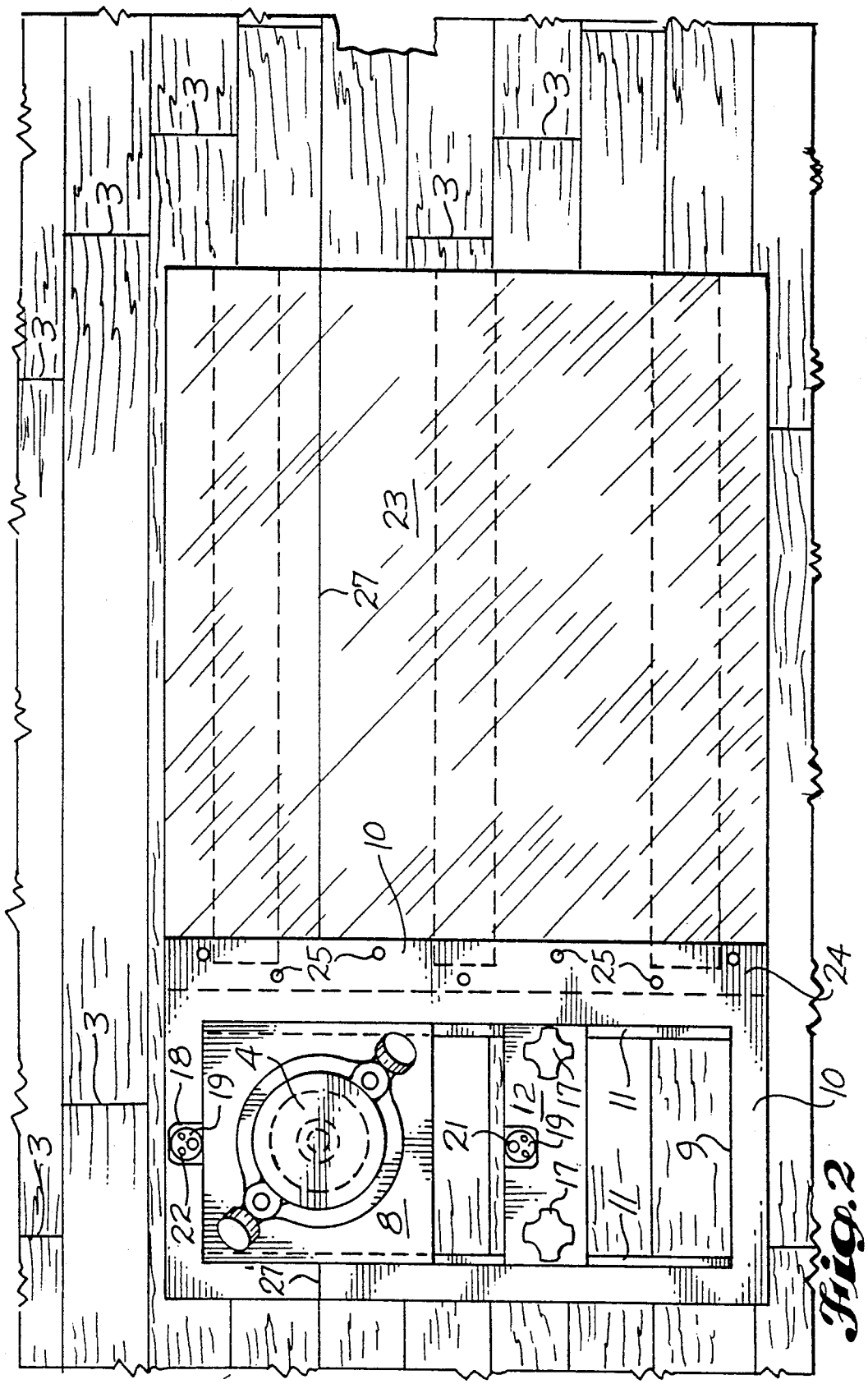

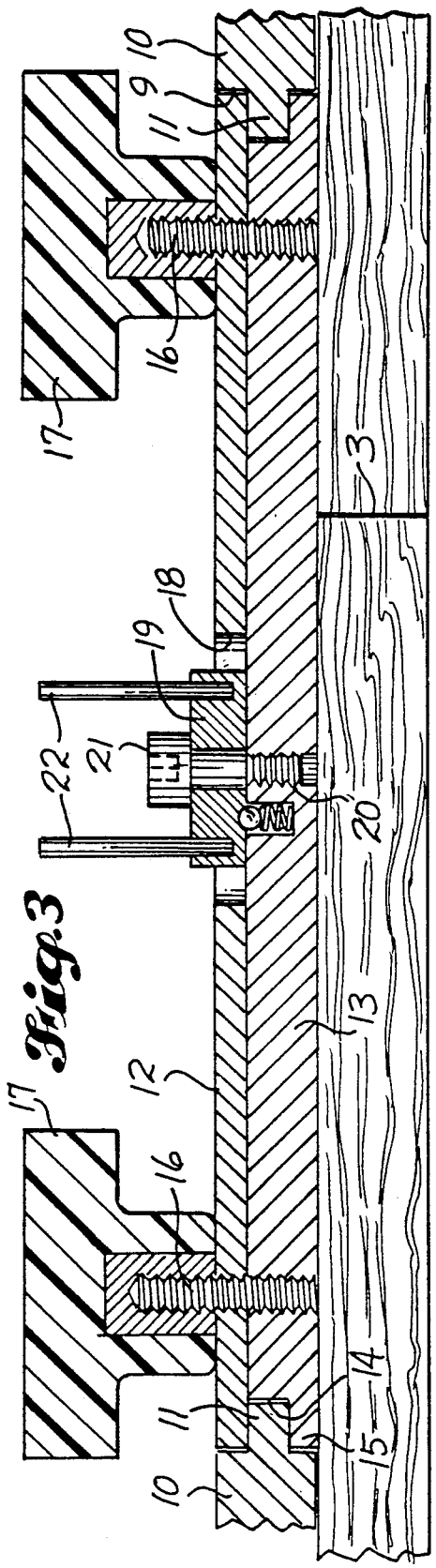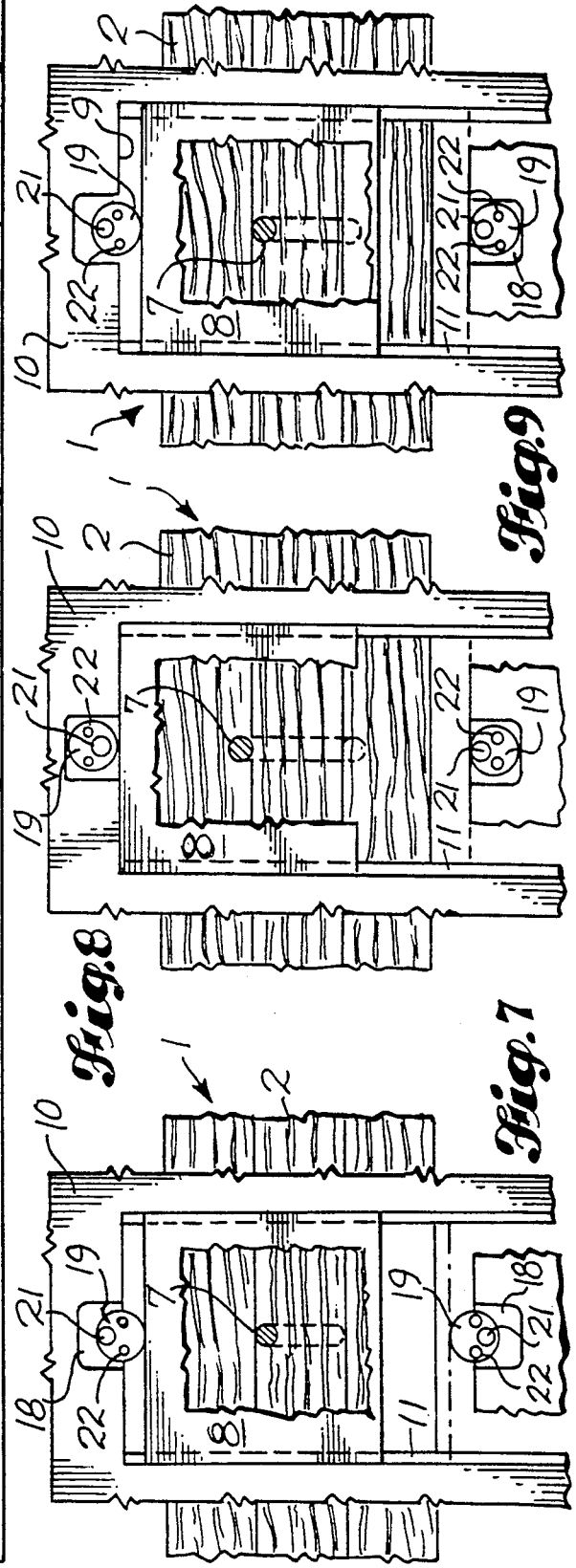

5,249,614

LAID FLOORING END JOINTER

Continuation of Ser. No. 335,668, Mar. 27, 1989, abandoned, filed as PCT/JP88/00683, Jul. 7, 1988.

BACKGROUND OF THE INVENTION

1. Field of the Invention

This invention relates to a jointer for jointing the ends of laid flooring boards, particularly for use in repairing floors.

2. Prior Art

In the past, in order to replace defective boards in repairing laid floors, the end of a laid flooring board has been jointed by the use of a hand-held chisel, in some cases supplemented by cutting with a hand-held rotary power saw. Not only has such procedure been time-consuming, but there is danger of inadvertently cutting into a board adjacent to the board being jointed which is not to be replaced.

A principal object of the present invention is to use a router for jointing the end of a laid flooring board.

Another object is to guide such a router so as to locate the jointing operation accurately and provide a straight cut which is square relative to the length of the board.

A further object is to control the displacement of the router so as to ensure that a jointing cut of precise length is made on the end of a selected floor board laid between adjacent flooring boards.

An additional object is to support a router for sliding displacement in controlled fashion by mechanism that can be set up quickly, easily and accurately.

It is also an object to provide mechanism for holding a router mounting firmly in a desired relationship to laid flooring during the operation of jointing the end of a laid flooring board.

The foregoing objects can be accomplished by mounting a router on a supporting slide that is reciprocable in guideways with stops for limiting movement of the slide along the ways to enable the jointing cut to be of precise length. The ways are held immobile by the worker kneeling on a positioning plate attached to the ways and having a gripping undersurface engageable with the floor to prevent sliding of the positioning plate over the floor.

BRIEF DESCRIPTION OF THE DRAWINGS

FIG. 2 is a top plan of the jointer.

FIG. 3 is a vertical section through a portion of the jointer taken on line 3—3 of FIG. 1.

FIGS. 7, 8 and 9 are fragmentary plans of a portion of the router showing parts in different operating positions and having parts broken away.

DETAILED DESCRIPTION

Figure 1:
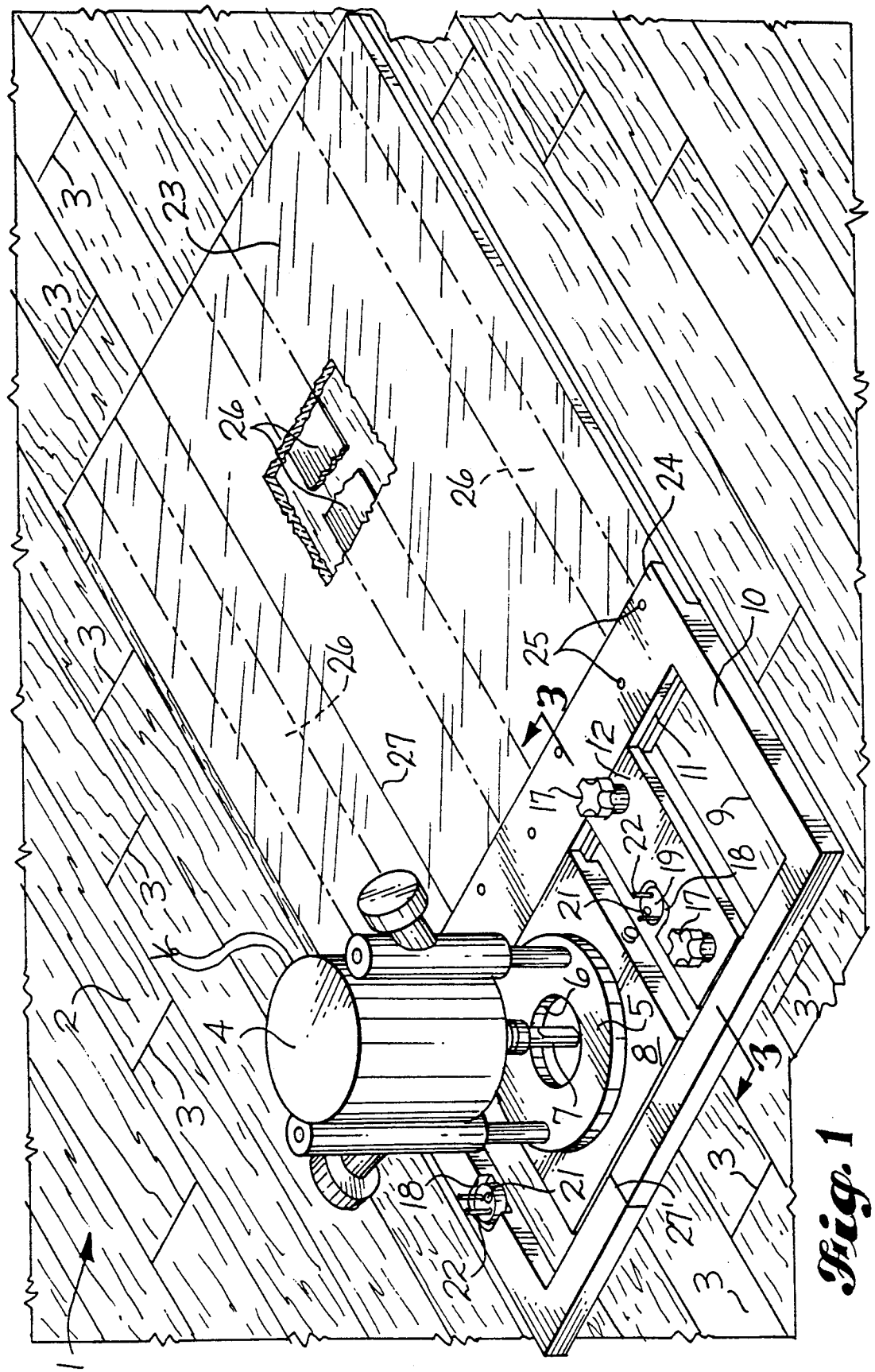
FIG. 1 is a top perspective of the jointer.

In repairing laid floors 1 made of individual boards 2, it may be necessary to replace defective parts of laid boards. In order to make a tight end joint 3 between a laid board to remain in place and a new board, it is necessary that the laid board be jointed to provide a new square end. Because the boards are laid on a subfloor, it is very difficult to joint with a saw the end of a board laid between two adjacent boards. Using a hand chisel to cut out a section of a laid flooring board and to joint a new end is time-consuming, and it is difficult to make a smoothly jointed board end. The present invention uses a router 4 to joint the end of a laid flooring board 2.

A difficulty with using a router held and guided by hand to remove a portion of a laid flooring board and to joint a new end on the laid board is the care with which the router must be manipulated in order to make a smooth square cut, even if a guideline is marked on the board to be cut, without injury to adjacent laid boards. The jointer of the present invention enables such jointing to be accomplished by the router 4 easily, quickly and accurately.

Figure 5:
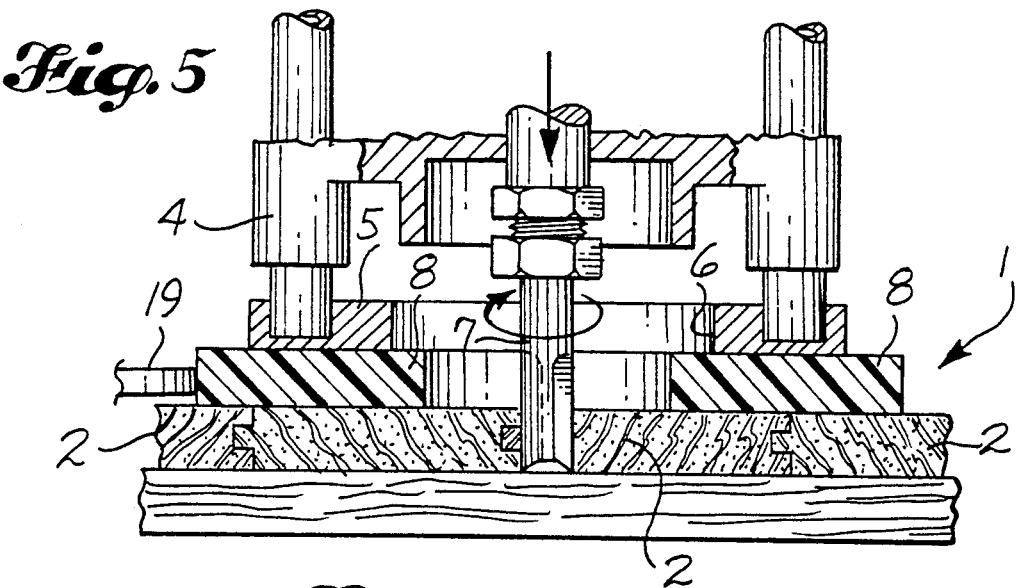
Figure 6:
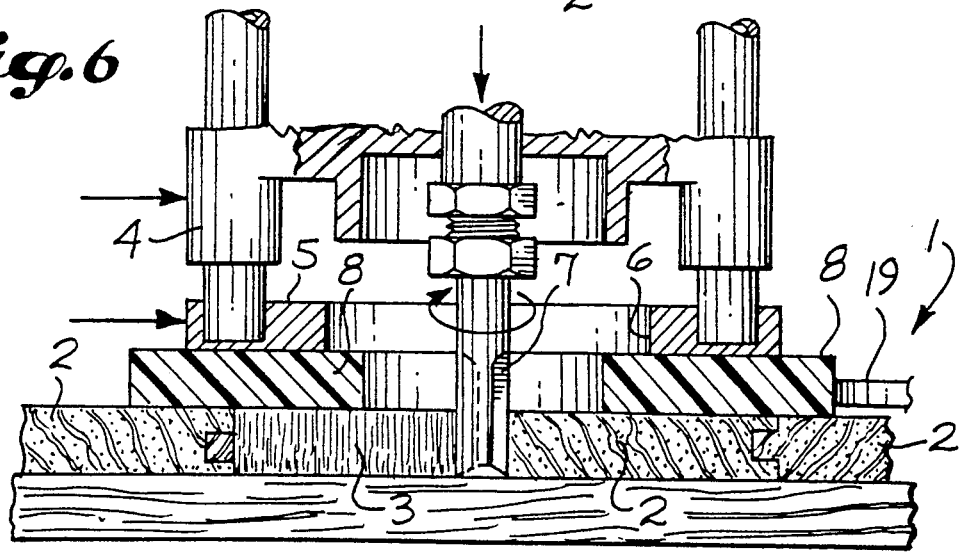

A conventional plunge router 4 is supported for elevational movement by posts on a circular base plate 5 having a central circular aperture 6 through which the router bit 7 projects downward. The router can be moved downward from the position shown in FIG. 5 a distance such that the lower end of the router bit just cuts through the thickness of the flooring boards 2 as shown in FIGS. 5 and 6.

The base plate 5 of the router is mounted on and attached to a slide 8 received within a rectangular aperture 9 of a router-guiding frame 10 as shown in FIGS. 1 and 2 constituting a jig. Tongues 11 forming linear ways extend in parallel relationship along the opposite longitudinal sides of the aperture 9. Opposite edges of the slide 8 are rabbeted at their undersides to provide upper flanges bearing of the upper sides of the tongues 11 so that the router and base plate can be lifted out of the ways in any position along the ways.

Reciprocation of the slide 8 along the ways 11 within the aperture 9 can be limited by a compound stop bar composed of an upper bar 12 and a lower bar 13 spanning across the aperture 9 between the ways. The opposite end portions of the upper bar 12 rest on the upper sides of the tongues 11. The opposite ends of the lower bar 13 have rabbets 14 to enable the upper portion of the bar length to clear the tongues 11 and to provide a bottom flange 15 extending under the tongues 11 as shown in FIG. 3.

Near opposite ends of the bars 12 and 13, respectively, bolts 16 are threadedly secured in the lower bar 13, and the upper bar 12 has correspondingly located apertures to slide over the upper ends of the bolts. Clamping knobs 17 have internally threaded cores that can screw onto the projecting upper ends of the bolts 16 so that, when such knobs are tightened, their skirts will press against the upper side of the upper bar 12. The depths of the rabbets 14 are slightly less than the thicknesses of the tongues 11 in the aperture 9 so that pressure exerted on the upper bar 12 by the skirts of the knobs 17 will pinch the tongues 11 between the marginal portions of the upper bar 12 and the lower flanges 15 of the lower bar 13 to fix the stop in any selected position along the ways formed by the tongues 11 for adjusting the length of the stroke of slide 8.

Auxiliary stops 19 are mounted in recesses 18, respectively, on the margin of the frame aperture 9 at the side of the router opposite the stop bar 12, 13 and on the margin of such stop bar adjacent to the router. Each of such auxiliary stops is a circular plate mounted on a pivot having an unthreaded portion extending through the stop disk, a threaded mounting shank 20 screwed into the frame 10 or stop bar 13 beneath the recess 18 and a head 21 disposed eccentrically of the stop disk center. Two pins 22 project upward from the circular plate to provide handles for angularly adjusting the plate on its pivot 20. Such stops can be held either in a projected position or in a retracted position by a detent mounted in the bottom of the recess 18 as shown in FIG. 3. Buttons are provided on the opposite edges of the slide 8 in positions for engagement with the stops 19 to facilitate precision location of the slide relative to the frame aperture 9.

A positioning plate 23, preferably made of transparent plastic material such as polycarbonate, is secured to a top flange 24 projecting from one edge of the router-guiding frame 10 by bolts 25. While such flange is shown as extending parallel to the ways 11 and to the path of reciprocation of the slide 8, such flange could be located at one end of the router-guiding frame 10 and extend perpendicular to the ways and path of reciprocation of the slide 8 if desired.

The bottom of the positioning kneeling plate 23 is substantially coplanar or flush with the bottom of the frame 10. At least a portion of the lower surface of the positioning plate is of gripping material which may be of abrasive character such as coarse emery paper, otherwise known as safety tread tape, or friction material such as elastomer, to prevent inadvertent shifting of the jointer when pressure is applied to the positioning plate by the worker kneeling on it. Conveniently, the gripping surface is in the form of several thin strips 26 of coarse emery paper bonded to the bottom of the positioning kneeling plate, as indicated in FIG. 1.

Also, the positioning kneeling plate 23 has a reference line 27 on its undersurface which can be aligned with a longitudinal joint between flooring boards 2 to locate the guideways 11 perpendicular to the longitudinal joints between the flooring boards. Also, the frame 10 has a guide line 27' at the side of its aperture 9 opposite the kneeling plate which is aligned with the reference line 27 to enable the frame to be placed in proper position with reference to a joint between the flooring boards at opposite sides of the frame 10.

In use, the reference line 27 is placed in registration with the longitudinal joint along one edge of a laid flooring board a portion of which is to be removed and on which a new jointed end is to be formed. The positioning plate reference line 27 and frame reference line 27' are located lengthwise of the laid flooring boards to locate the router bit 7 in position to make the end cut of the laid flooring board at the proper position. The clamping knobs 17 can then be loosened and the stop 12, 13 can be positioned so that, when the auxiliary stops 18 are in the positions shown in FIG. 7, both stops being projected into the aperture 9, the space between such auxiliary stops will be equal to the width of the slide 8 parallel to the ways 11 plus the width of a flooring board less the diameter of the router bit.

Figure 4:
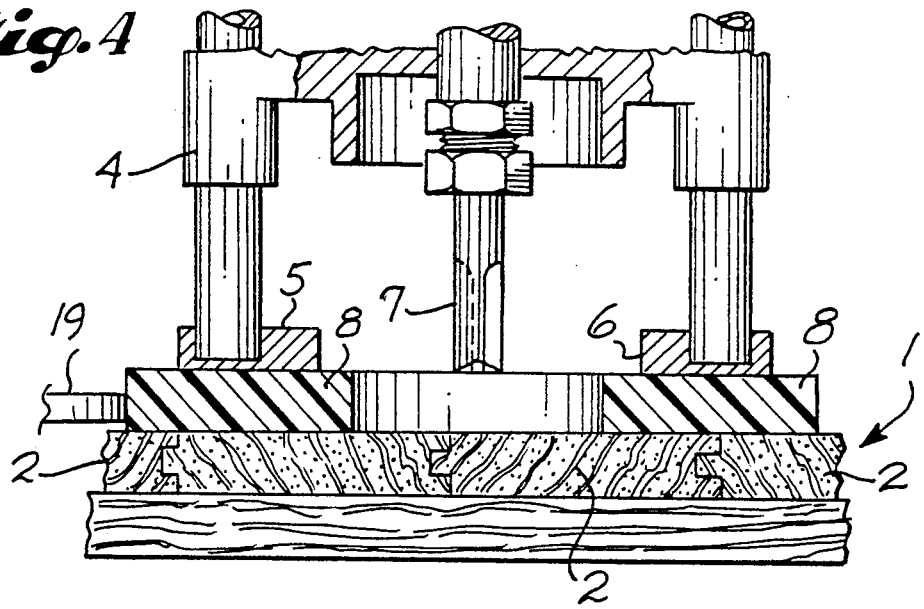
FIGS. 4, 5 and 6 are corresponding vertical sections through a portion of the jointer showing parts in different positions and having parts broken away.

With the jointer held in this position by the worker kneeling on the positioning kneeling plate 23 alongside the router, the router can be moved downward from the position shown in FIG. 4 to the position shown in FIG. 5. With the router held in this position, the slide 8 can be reciprocated across the board to form the jointed board end 3, as shown in FIG. 6. The router will then be raised back to the position of FIG. 4, and the jointer can be removed from the location of the cut. It will then be necessary to touch up the jointed flooring board end by chiseling out the fillets formed by the router at each end of the cut.

If the portions of the boards at opposite sides of the board to be jointed are to be replaced, the auxiliary stops 19 are adjusted angularly about their pivots 20 a half turn, i.e., 180 degrees, from the positions shown in FIG. 7 to the reverse positions shown in FIG. 8. The degree of eccentricity of the auxiliary stops is such that the stroke of the slide 8 can be increased by thus turning both auxiliary stops a distance equal to the diameter of the router bit 7 plus a small amount such as one-quarter of an inch. Thus, if the diameter of the router bit is one-half inch, a half turn repositioning of one auxiliary stop would increase the possible travel of the slide 8 by three-eighths of an inch and turning both stops would increase the travel three-quarters of an inch. Such movement will enable the jointing cut to be made entirely across the width of a laid flooring board as shown in FIG. 8.

If it were desired for a jointing cut to encroach into the board on only one side of the board the end of which is to be jointed, the auxiliary stop 19 on the frame would be positioned in the projected position as shown in FIG. 9 while the auxiliary stop on the stop bar 12, 13 would be in the retracted position so that the router bit 7 could make a clean jointing operation at the end nearer the stop bar, whereas it would be necessary to remove the fillet at the opposite end of the jointing cut with a chisel.

I claim:

1. A flooring board end jointer comprising a plunge router, supporting means for said router including a slide, guide means including ways for guiding movement of said slide transversely of a laid flooring board, adjustable stop means including a stop bar bridging between said ways for limiting the stroke of said slide along said ways, auxiliary stop means engageable by said slide and adjustable to alter the limiting position of movement of said slide relative to said stop bar without changing the position of said stop bar relative to said ways, and positioning means for positioning said guide means relative to said flooring to hold said guide means in proper position for guiding movement of said slide transversely of a laid flooring board for enabling said router to joint the end of such laid flooring board.

2. A flooring board end jointer comprising a plunge router, supporting means for said router, guide means guiding said supporting means for movement of said router transversely of a laid flooring board to joint the end thereof, positioning means for positioning said guide means relative to laid flooring to hold said guide means in proper position for guiding movement of said router to joint the end of the laid flooring board, and stop means engageable by said supporting means for limiting movement of said supporting means relative to said positioning means including an auxiliary stop member mounted on said stop means for adjustment of said auxiliary stop member relative to said stop means to alter the position at which the movement of said supporting means is stopped relative to said positioning means without displacing said stop means relative to said positioning means.

3. A flooring board end jointer comprising a plunge router, supporting means for said router, guide means guiding said supporting means for movement of said router transversely of a laid flooring board to joint the end thereof, and positioning means for positioning said guide means relative to laid flooring to hold said guide means in proper position for guiding movement of said router to joint the end of the laid flooring board including a plate attached to said guide means for positioning relative to a laid flooring board the end of which is to be jointed.

4. The jointer defined in claim 3, in which the positioning means plate has a locating line for positioning relative to a flooring joint.

5. The jointer defined in claim 3, and gripping means on the bottom of the positioning plate for gripping laid flooring to prevent inadvertent shifting of the positioning plate relative to the laid flooring.

6. A process for jointing the end of a laid flooring board which comprises mounting a plunge router in guide means, locating such guide means relative to laid flooring in a position for guiding movement of the router to joint the end of a laid flooring board, and holding the guide means in such position by a worker kneeling on a positioning kneeling plate attached to the guide means during jointing movement of the router.

7. In a flooring board end jointer, a jig for a plunge router comprising supporting means for the router, guide means guiding said supporting means for movement of the router transversely of a laid flooring board to joint the end thereof, and a positioning kneeling plate attached to said guide means to be pressed on the floor by a worker kneeling on said kneeling plate for holding said guide means in proper position relative to the laid flooring board the end of which is to be jointed.

8. In a flooring board end jointer, a jig for a plunge router comprising a supporting slide for the router, linear recessed guide means guiding said slide for linear movement transversely of a laid flooring board, said supporting slide being removable from said linear guide means merely by lifting said supporting slide out of said linear recessed guide means, and positioning means for holding said linear guide means in proper position relative to laid flooring for guiding linear movement of the router to joint the end of the laid flooring board.

9. A flooring board end jointer comprising a plunge router, supporting means for said router including a slide, guide means including spaced parallel tongues forming ways engageable by said slide, adjustable stop means bridging between said tongues and including flanges engageable with one side of said tongues, and clamp means including movable means engageable with the other side of said tongues and cooperating with said flanges for clamping said stop means to said tongues for fixing the position of said stop means relative to said tongues.

10. In a flooring board end jointer, a jig for a plunge router comprising supporting means for the router, guide means guiding said supporting means for movement of the router transversely of a laid flooring board to joint the end thereof, and two-position stop means engageable by said supporting means for limiting movement of said supporting means relative to said guide means and including a member held in one position for limiting movement of said supporting means in one predetermined position and movable into a second predetermined position for limiting movement of said supporting means in a second predetermined position.

11. The jig defined in claim 10, in which the two-position stop means includes a turnable stop engageable by the slide means for establishing one predetermined position of the slide means when the stop member is in one turned position and for establishing the second predetermined position of said slide means when said turnable stop member is turned to a different predetermined position.

* * * * *